United States Patent [19]

Sota

[11] Patent Number: 4,860,126
[45] Date of Patent: Aug. 22, 1989

[54] TAPE TRANSPORTING DEVICE

[75] Inventor: Koichi Sota, Tokyo, Japan

[73] Assignee: Otari Electric Company, Ltd., Tokyo, Japan

[21] Appl. No.: 130,280

[22] Filed: Dec. 8, 1987

[30] Foreign Application Priority Data

Dec. 24, 1986 [JP] Japan .................... 61-314071

[51] Int. Cl.$^4$ .................... G11B 5/86; G11B 15/00
[52] U.S. Cl. .................... 360/16; 360/95
[58] Field of Search .................... 360/15, 16, 17, 93, 360/95; 226/118, 119, 95

[56] References Cited

U.S. PATENT DOCUMENTS

| | | | |
|---|---|---|---|
| 1,949,237 | 2/1934 | Bradner | 118/33 |
| 2,979,244 | 4/1961 | Pouliart et al. | 226/118 |
| 3,185,400 | 5/1965 | Maxey | 242/55.12 |
| 3,499,589 | 3/1970 | Johnson et al. | 226/97 |
| 4,128,198 | 12/1978 | Woodley | 226/97 |
| 4,213,159 | 7/1980 | King | 360/16 |
| 4,469,265 | 9/1984 | Manquen | 226/97 |
| 4,698,701 | 10/1987 | Gantzhorn, Jr. et al. | 360/16 |

Primary Examiner—Vincent P. Canney
Attorney, Agent, or Firm—Cushman, Darby & Cushman

[57] ABSTRACT

In a tape transporting device of the present invention, a long and winding endless loop master tape is partially stored in a loop bin, and a copy tape which has been obtained from a feeding reel is transported and wound by a winding reel. Moreover, a rail along which the master tape is transported and an air outlet which is established at one end of the rail are established in the vicinity of the outlet of the loop bin used for storing the master tape. A tension application roller, which is used for impressing tension on the master tape, is established behind the air outlet. The aforementioned air outlet ejects air toward the master tape, and the master tape is forced toward the rail by the pressure of the ejected air. Accordingly, when the master tape is retrieved from the outlet of the loop bin, the master tape is pressed toward the rail, and as a result, tension is produced. Even if the master tape transporting speed increases, there are no disturbances since the master tape is continuously pressed toward the rail.

12 Claims, 4 Drawing Sheets

TAPE TRANSPORTING DEVICE

BACKGROUND OF THE INVENTION

1. Field of the Invention

The present invention concerns a tape transporting device used for transporting a magnetic tape. More specifically, the present invention concerns a tape transporting device used for transporting an endless loop magnetic tape.

2. Description of the Prior Art

As a technique for efficiently duplicating a large quantity of a video tape on which video signals have been recorded or a tape on which pulse code modulation (PCM) signals have been recorded, a transfer technique wherein an unrecorded copy tape is aligned with a master tape on which signals have preliminarily been recorded and a magnetic field or heat is impressed on the interface between the two tapes for the purpose of transferring the signals has been developed. Numerous conventional tape transporting devices have been developed for transporting the master tape and copy tape in the aforementioned transfer duplication technique. A representative example of a tape transporting device is shown in U.S. Pat. No. 4,213,159. In this device, front and rear ends of a master tape are connected to one another, and the master tape is used as a so-called "endless loop." In other words, a long and winding master tape is partially stored in a loop bin, and the tape is partially outside of the loop bin. An extremely narrow slit is formed at an outlet of the loop bin in such a way that the master tape will not be entangled when it is retrieved from the loop bin.

One important problem of the aforementioned conventional tape transporting device is that the transporting of the master tape stored in the loop bin through the bin outlet is unstable.

In other words, since a long and winding master tape is stored in the loop bin, virtually no tension is applied to the master tape when it is retrieved from the loop bin.

As a result, it is difficult to impress tension on the master tape even if the master tape is retrieved from a slit, and it is impossible to attain a high tape transporting stability. In prior art devices, if the master tape transporting speed increases, the master tape cannot be smoothly removed from the loop bin, and as a result, the master tape is easily damaged.

The present invention improves the transporting stability of a master tape which is stored in a loop bin as an endless loop.

SUMMARY OF THE INVENTION

In accordance with the present invention, there is provided a tape transporting device for storing and transporting a portion of an endless loop master tape. The device includes first means for storing and transporting the portion of the master tape. The first means has an outlet for removing the tape portion. The device has means for applying a force on the master tape in the vicinity of the outlet tending to keep the tape portion in the first means. Further, the device comprises means, outside of the first means, for applying tension to, while removing, the master tape from the first means.

The first means comprises a substantially horizontal loop bin having an inner chamber defined by a conveyor belt, subpanels, guide rails and a cover. The first means outlet is a gap between end portions of two of the guide rails.

The force applying means comprises an air outlet port having small holes aligned and oriented, such that the master tape is forced toward the first means by air when air is blown from the small holes.

The tension applying means comprises tape guides and a rotatable load roller having an outer circumferential surface through which are numerous small holes. Air can be sucked through the small holes, sucking the master tape toward the small holes preventing slippage therebetween.

The device further includes a contact printing station comprising energy applying means and pressure applying means. The pressure applying means comprises an air cap for blowing air and back-up roller means. This roller means is capable of being transported toward the air cap to an active position and away from the air cap to an inactive position. When a copy tape and the master tape are between the air cap and the backup roller means in the active position and one of the tapes is being transported, the air from the air cap forces the tapes into intimate contact with each other transporting the other one of the tapes without slippage.

DESCRIPTION OF THE PREFERRED EMBODIMENT(S)

Figure 1:
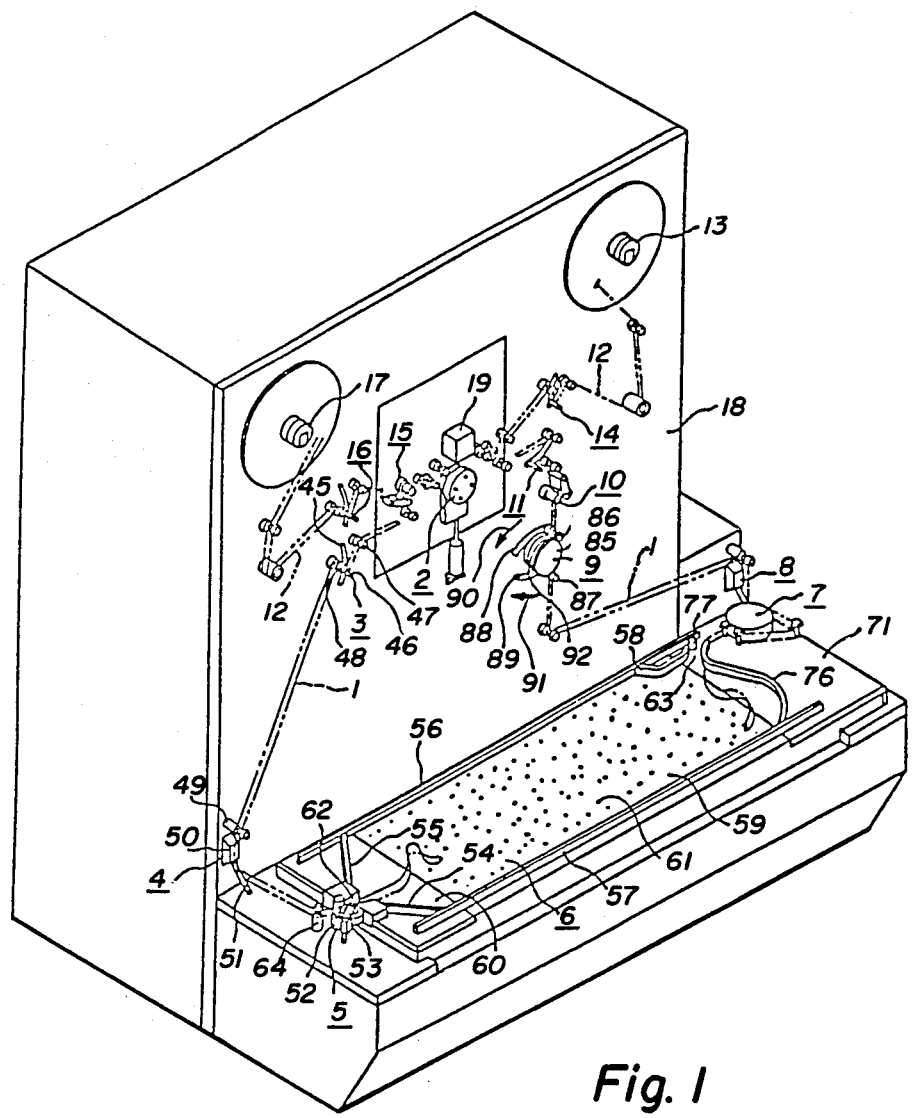
FIG. 1 is a simplified perspective view of the preferred embodiment of the present invention.

FIG. 1 pertains to a preferred embodiment of the present invention. (1) is a master tape. The master tape (1) is transported from a transfer unit or contact printing station (2) to a first tension arm (3), first directional switch mechanism (4), first tension control mechanism (5), loop bin (6), tension application mechanism (7), second directional switch mechanism (8), load mechanism (9), second tension control mechanism (10), and second tension arm (11). (12) is a copy tape. The copy tape (12), which is obtained from a feeding reel mounted on the feeding reel mount (13), is transported and wound by a winding reel mounted on the winding reel mount (17) via a third tension arm (14), the transfer unit (2), a drive mechanism (15), and a fourth tension arm (16).

Figure 2:
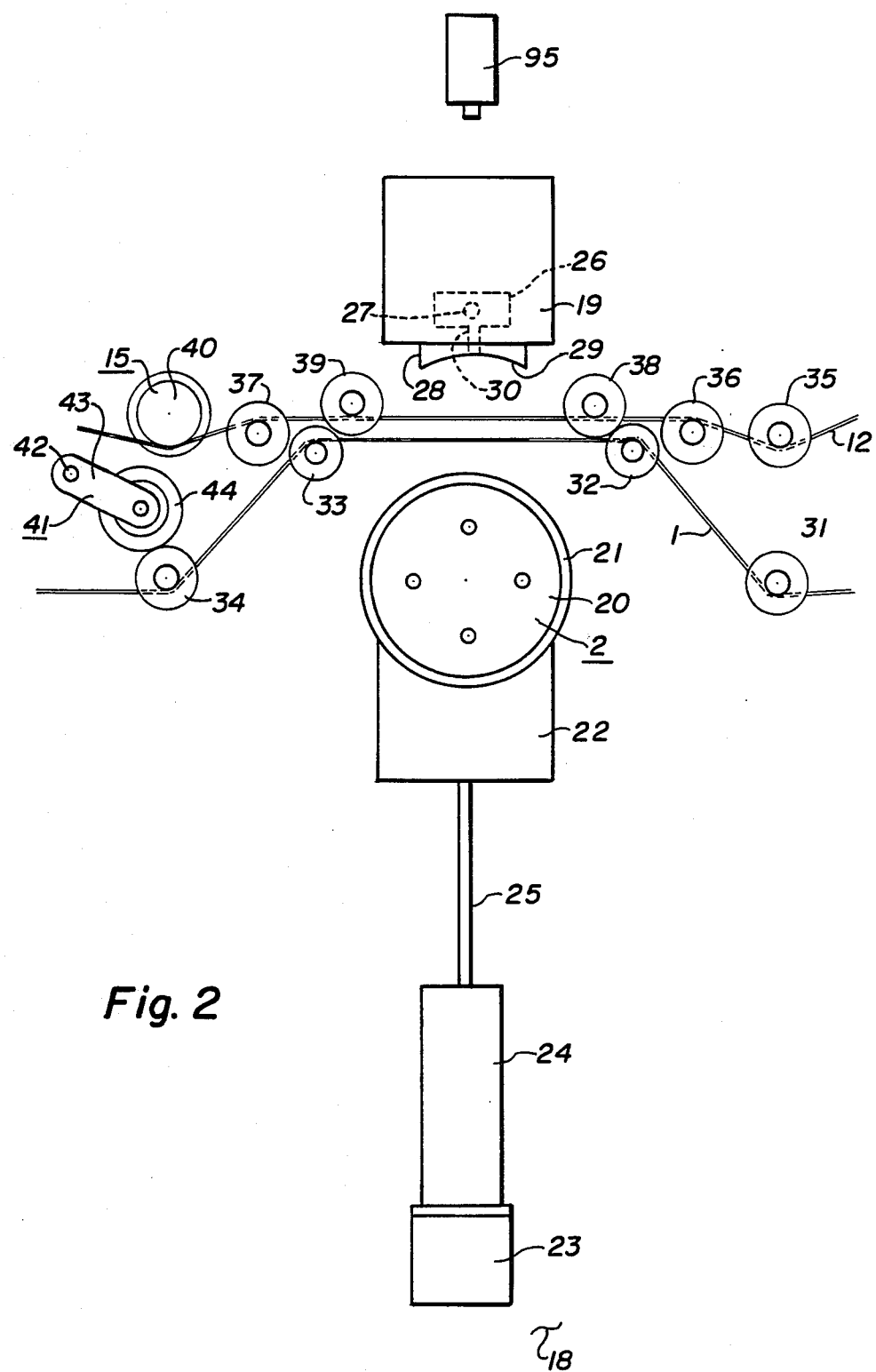
FIG. 2 is a front view of a drive mechanism and a contact printing station comprising a backup roller and an air cap in an inactive position.

FIG. 2 pertains to the structures of the transfer unit or contact printing station (2) and the drive mechanism (15). The printing station comprises an energy applying means (95) and a pressure applying means. The energy applying means can be a heat source, such as a laser or a magnetic field. The pressure applying means comprises an air restrainer or cap (19), which is attached to a vertical panel base (18), and a transfer roll or backup roller (20), which can be transported toward the air cap (19) to an active position and away from the air restrainer (19) to an inactive position as shown in FIG. 2. The transfer roll (20) is characterized by a cylindrical shape which has an outer circumferential surface (21), which has been smoothly finished, and the roller is attached to a slide base (22), in a free rotatable position. A shaft (25) of the cylinder (24), which is fixed to the panel base (18) via an angle connector (23), is connected to one end of the slide base (22). When the cylinder (24) is activated, the transfer roll (20) is transported toward or away from the air restrainer (19).

The air restrainer (19) has an air chamber (26), and the air chamber (26) is connected to a high-pressure air source (not indicated in the figure) via a hole (27). (28) is an outlet. The air cap (19) has a curved surface (29), which is characterized by a curvature virtually identical to the curvature of the outer circumferential surface (21) of the transfer roll (20). High-pressure air which has been supplied from the air chamber (26) is fed toward and through the curved surface (29) via an air path (30). The position of the transfer roll (20) in FIG. 2 is away from the air restrainer (19). When it is thrusted forward or towards the air cap (19), a small gap is created between the outer circumferential surface (21) of the transfer roll (20) and the curved surface (29).

The master tape (1) and the copy tape (12) are between the transfer roll (20) and the air restrainer (19). More specifically, the master tape (1) is held by guide rollers (31), (32), (33), and (34), and the copy tape (12) is held by guide rollers (35), (36), and (37). Guide rollers (38) and (39) are used to guide the master tape and copy tape when the roll (20) is in the active position extended towards the air cap (19).

When the transfer roll (20) approaches the air restrainer (19), the master tape (1) and copy tape (12) are placed in intimate contact with each other, and when high-pressure air is supplied from the air path (30), the master tape (1) and copy tape (12) are forced toward the outer circumferential surface (21) of the transfer roll (20). In this case, the master tape (1) is guided by the guide rollers (31), (32), (38), (39), (33), and (34), and the copy tape (12) is guided by the guide rollers (35), (36), (38), (39), and (37). Thus, when the copy tape (12) and the master tape (1) are between the air cap (19) and the backup roller (20) in the active position and one of the tapes is being transported, such as by drive mechanism (15), the air from the air cap forces the tapes into intimate contact with each other transporting the other one of the tapes without slippage.

In FIG. 2, the drive mechanism (15) consists of a capstan (40) and pinch roller (41). The capstan (40) is rotated and driven by a capstan motor (not indicated in the Figure), which also controls the velocity. The pinch roller (41) is characterized by a structure wherein a roller (44) is attached to a front end of a pinch roller arm (43), which can be freely rotated around a shaft or axle (42). When the axle (42) is rotated by a solenoid (not indicated in the Figure), the roller (44) is pressed toward the capstan (40). In this case, the copy tape (12) is pinched between the roller (44) and the capstan (40), and when the capstan (40) is rotated, the copy tape (12) is transported. If the transfer roll (20) is located in the vicinity of the air restrainer (19) in the aforementioned process, not only the copy tape (12) but also the master tape (1) are transported since both the master tape (1) and the copy tape (12) are forced together by the high-pressure air ejected from the air path (30).

In FIG. 1, the first tension arm (3) consists of a long hole (45), which is established on the panel base (18), swing arm (46), which engages in a swinging motion within the mobile range of the long hole (45), and guide rollers (47) and (48), which are established one on each side of the long hole (45). The master tape (1) is transported from the guide roller (47) to the swing arm (46) and to the guide roller (48). The swing arm (46) is continuously urged into a direction opposite to the tension of the master tape (1) by a spring (not indicated in the Figure), and a position detection mechanism (not indicated in the Figure) is attached to the swinging arm (46) for the purpose of detecting the swinging position within the mobile range of the long hole (45). As a result, a tension signal for the master tape (1) is obtained as an output of the position detection mechanism.

In FIG. 1, furthermore, the first directional switch mechanism (4) consists of a guide roller (49) and a guide rod (51), which is established at an angle of approximately 45° with the plane of the panel base (18) via a base block (50), which is attached to the panel base (18). After the master tape (1) has been guided from the guide roller (49) to the guide rod (51), the direction is diverted by approximately 90° and then guided by a guide roller (64).

In FIG. 1, the first tension control mechanism (5) consists of a capstan (52) and a pinch roller (53). The capstan (52) is driven by a capstan motor (not indicated in the Figure). The structure of the pinch roller (53) is virtually identical to the structure of the pinch roller (41) shown in FIG. 2, and it drives the master tape (1) together with the capstan (52).

The loop bin (6) shown in FIG. 1 has an inner chamber (59), which is surrounded by guide rails (54), (55), (56), (57), (58), and (76), and which stores the master tape (1). The inner chamber (59), furthermore, has a bottom consisting of a subpanel (60), conveyor belt (61), and subpanel (71) as well as a cover (67), which covers the guide rails (54), (55), (56), (57), (58), and (76), as FIG. 4 indicates. In other words, the inner chamber (59) is a space for storing a portion of the winding master tape (1), the chamber (59) defined by the bottom guide rails (54), (55), (56), (57), (58), and (76), and the cover panel (67). The inner chamber (59) also has an inlet (62) (i.e., inlet for the master tape (1)) and an outlet (63) (i.e., outlet for the master tape (1)).

Figure 3:
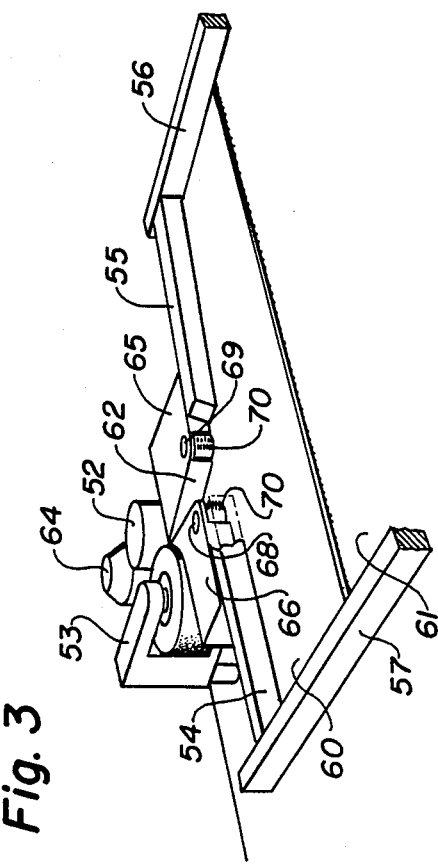
FIG. 3 is an enlargement of an area in the vicinity of an inlet of a loop bin.

FIG. 3 shows the structure of the inlet (62). The inlet (62) is a gap formed by a block (65), which is established in the vicinity of the capstan (52), and a block (66), which is established in the vicinity of the pinch roller (53). (68) and (69) are air outlet guides. The air outlet guides (68) and (69) are formed on both sides of the inlet (62), and each has numerous small holes (70). The numerous small holes (70) are connected to a high-pressure air source (not indicated in the Figure), and they are used for blowing high-pressure air. The inlet (62) guides the master tape via the capstan (52) and pinch roller (53), and the air outlet guides (68) and (69) prevent the stagnation of the master tape (1) in the vicinity of the inlet (62) by blowing high-pressure air toward the master tape (1).

Figure 4:
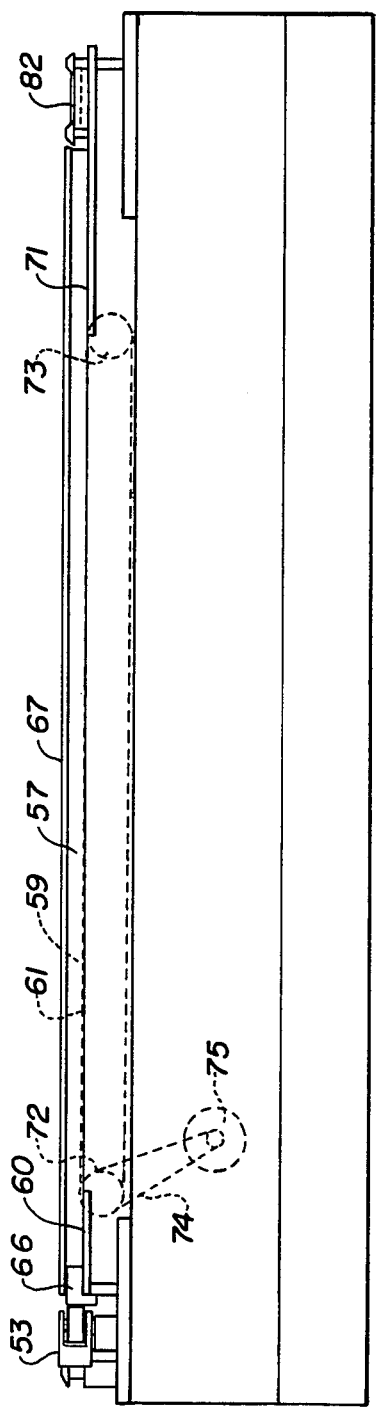
FIG. 4 is a front view of the loop bin.

FIG. 4 shows a front view of the loop bin (6). The conveyor belt (61) is an endless belt which is stretched across a belt roller (72), which is established in the vicinity of the subpanel (60), and a belt roller (73), which is established in the vicinity of the subpanel (71). The conveyor belt (61) is rotated clockwise in FIG. 4 by a motor (75) via a drive belt (74). As a result, the master tape (1), which is located between the cover panel (67) and the conveyor belt (61), is transported from the left toward the right.

Figure 5:
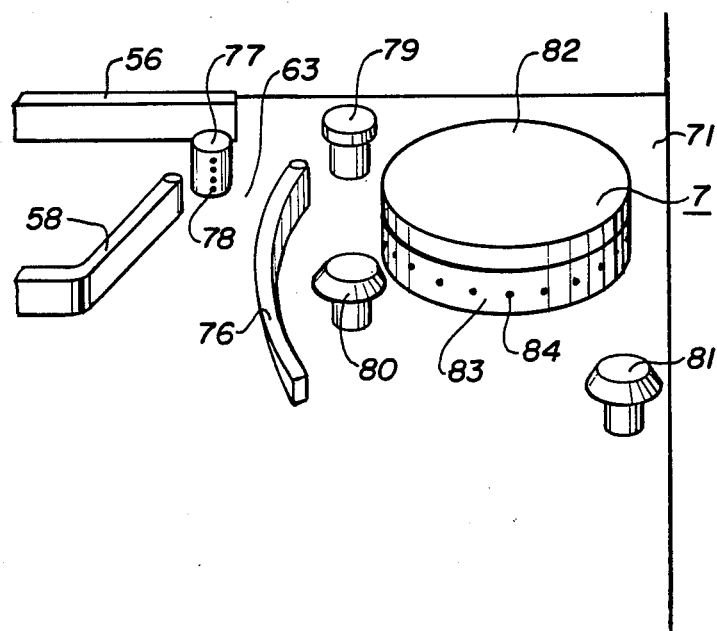
FIG. 5 is an enlargement of an area in the vicinity of an outlet of the loop bin.

FIG. 5 pertains to the structures of the outlet (63) of the loop bin (6) and the tension application mechanism (7). The outlet (63) is a gap between end portions of the guide rail (58) and the guide rail (76). An air outlet post (77) is established in the vicinity of the outlet (63). The air outlet post (77) has small holes (78) which are connected to a high-pressure air source (not indicated in the Figure), and high-pressure air is supplied from the small holes (78) whenever it is needed.

The small holes (78) are aligned and oriented in such a way that the master tape (1) will be forced toward the guide rail (76) by the high-pressure air which has been blown from the small holes (78).

The tension application mechanism (7) consists of the tape guides (79), (80), and (81), and a load roller (82). The load roller (82) is attached to the subpanel (71) in a free rotatable position, and numerous small holes or openings (84) are formed on the outer circumferential surface (83). The small holes (84) can be connected to a suction mechanism (not indicated in the figure), and air can be sucked through the small holes (84). When the master tape (1) is contacted with the outer circumferential surface (83), the master tape (1) is sucked toward the small holes (84). In an alternate embodiment, the surface (83) can be formed of a porous material having uniformly distributed openings throughout so that the air can be sucked more uniformly towards the surface (83). As a result, slippage of the master tape (1) on the outer circumferential surface (83) is inhibited. The load roller (82) is connected to an electrical power generator (not indicated in the Figure), and the power generator is rotated in accordance with the rotation of the load roller (82). The power generator is connected to a load resistor (not indicated in the Figure), and accordingly, a certain torque is required for rotating the load roller (82). After the master tape (1) has been removed from the guide rail (76) to the tape guide (79), it is wound clockwise in FIG. 5 around the outer circumferential surface (83) of the load roller (82). Then the master tape (1) travels via the tape guides (80) and (81), and is guided toward the second directional switch mechanism (8) shown in FIG. 1.

The structure of the second directional switch mechanism (8) is identical or comparable to the structure of the first directional switch mechanism (4), and no further explanations are provided.

The load mechanism (9) consists of a main roller (85) and a pair of mobile rollers (86) and (87).

The mobile rollers (86) and (87) can be transported in the directions of the arrows (90) and (91), respectively, within the mobile ranges of long holes (88) and (89) on the panel base (18). A brake mechanism (not indicated in the Figure) which imposes a load on the rotation of the main roller (85) is attached to the main roller (85). When the mobile rollers (86) and (87) are transported in the directions of the arrows (90) and (91), respectively, the master tape (1) is wound around an outer circumferential surface (92) of the main roller (85). The outer circumferential surface (92) of the main roller (85) is covered with a cork rubber layer in such a way that slippage of the master tape (1) will be inhibited. When the master tape (1) is wound around the outer circumferential surface (92) of the main roller (85) via the mobile rollers (86) and (87), the master tape (1) is transported opposite to the load of the brake mechanism attached to the main roller (85).

The structure of the second tension control mechanism (10) is identical or comparable to that of the first tension control mechanism (5), and no further explanations are provided.

As in the case of the first tension arm (3), the second tension arm (11) detects the tension of the master tape (1), and the structure of this tension arm is identical or comparable to that of the first tension arm (3).

The third tension arm (14) and the fourth tension arm (16) detect the tension of the copy tape (12). The structures of these tension arms, too, may be identical or comparable to that of the first tension arm (3). The feeding reel mount (13) and the winding reel amount (17) are rotated and driven by a reel motor (not indicated in the Figure).

Next, the system for controlling the tensions of the master tape (1) and copy tape (12) will be explained.

The detection output of the tension of the master tape (1) which has been detected by the first tension arm (3) is supplied into the first tension control mechanism (5) as input data. As a result, the tension of the master tape (1) between the transfer unit (2) and the first tension control mechanism (5) is regulated at a certain level by the first tension arm (3) and first tension control mechanism (5).

The tension detection output of the second tension arm (11) is supplied to the second tension control mechanism (10) as input data. As a result, the tension of the master tape (1) between the second tension control mechanism (10) and the transfer unit (2) is controlled at a certain predetermined level by the second tension arm (11) and the second tension control mechanism (10). The detection output of the copy tape (12) which has been detected by the third tension arm (14) is supplied to the feeding reel mount (13) as input data. As a result, the tension of the copy tape (12) between the feeding reel mount (13) and the transfer unit (2) is controlled at a certain level by the third tension arm (14) and the feeding reel mount (13). The detection output of the tension of the copy tape (12) which has been detected by the fourth tension arm (16) is supplied to the winding reel mount (17) as input data. As a result, the tension of the copy tape (12) between the drive mechanism (15) and the winding reel mount (17) is controlled at a certain level by the fourth tension arm (16) and the winding reel mount (17).

Next, the specific actions of the tape transporting device shown in FIG. 1 will be explained.

The master tape (1) and the copy tape (12), which are shown in FIG. 1, are positioned according to the aforementioned configuration. Subsequently, the transfer unit (2) is activated, and the mobile rollers (86) and (87) of the load mechanism (9) are transported into the directions of the arrows (90) and (91), and the tension application mechanism (7) is activated. Next, the first tension control mechanism (5), second tension control mechanism (10), feeding reel mount (13), and winding reel mount (17) are activated, and the tensions of the master tape (1) and copy tape (12) on both sides of the transfer unit (2) are controlled at certain predefined levels. Next, high-pressure air is ejected from the air outlet guides (68) and (69) shown in FIG. 3, and the conveyor belt (61) is driven. As a result, the winding master tape (1) within the inner chamber (59) shown in FIG. 1 is directly transported toward the outlet (63). At the same time, high-pressure air is ejected from the air outlet post (77) in the vicinity of the outlet (63).

As a result, the master tape (1) is forced toward the guide rail (76) at the outlet (63). Since the master tape (1) is forced toward the guide rail (76), sufficient tension is sustained between the tension application mechanism (7) and the guide rail (76). If the copy tape (12) is subsequently transported by the drive mechanism (15), not only the copy tape (12) but also the master tape (1) are simultaneously transported.

As the foregoing explanations clearly demonstrate, if the device of the present invention is used, the portion of the winding master tape (1) stored in the loop bin (6) can be blown toward the guide rail (76) by an air stream generated from the air outlet post (77), and tension can be applied to the master tape (1) by th tension application mechanism (7). Even when the master tape (1) is retrieved from the loop bin (6) at a high speed, entanglement of the master tape (1) can be inhibited. Thus, the present invention provides a tape transporting device which yields a high tape transporting stability.

I claim:

1. A tape transporting device comprising: a horizontal loop bin for storing and transporting a portion of a long and endless loop master tape, a guide rail established at an outlet of the loop bin, an air outlet post for blowing air toward the master tape and the guide rail and for forcing the master tape forward the guide rail by the blowing air, and a movement resisting mechanism which is established in the vicinity of the outlet of the loop bin, which has an outer circumferential surface for contacting the master tape and resisting movement of the master tape while it is being transported.

2. A tape transporting device for storing and transporting a portion of an endless loop master tape, comprising:
   first means for storing and transporting the portion of the master tape, the first means having an outlet for removing the taper portion from a substantially horizontal loop bin;
   second means for applying a force on the master tape in the vicinity of the outlet tending to keep the tape portion in the first means; and
   rotatable means, outside of the first means, for applying resistance to the movement of the tape.

3. The tape transporting device as set forth in claim 2 wherein the substantially horizontal loop bin includes an inner chamber defined by conveyor belt, sub-panels, guiderails and a cover.

4. The tape transporting device as set forth in claim 3, wherein the first means outlet is a gap between end portions of two of the guide rails.

5. The tape transporting device as set forth in claim 2, wherein the second means further comprises
   an air outlet post having small holes aligned and oriented such that the master tape is forced toward the first means when air is blown from the small holes.

6. The tape transporting device as set forth in claim 2, wherein the rotatable means further comprises
   tape guides and
   a rotatable load roller having an outer circumferential surface through which are numerous openings such that air can be sucked through the openings sucking the master tape toward the circumferential surface inhibiting slippage therebetween.

7. The tape transporting device as set forth in claim 6, wherein:
   the tape guides comprise first, second and third tape guides
   such that the device is for transporting the master tape from the first means outlet to the first tape guide around the outer circumferential surface of the rotatable load roller to the second tape guide and then to the third tape guide.

8. The tape transporting device as set forth in claim 2, further comprising
   a contact printing station comprising energy applying means and pressure applying means.

9. The tape transporting device as set forth in claim 8, wherein the pressure applying means comprises
   an air cap for blowing air, and
   backup roller means capable of being transported toward the air cap to an active position and away from the air cap to an inactive position,
   whereby when a copy tape and the master tape are between the air cap and the backup roller means in the active position and one of the tapes is being transported, the air from the air cap forces the tapes into intimate contact with each other transporting the other one of the tapes without slippage.

10. The tape transporting device as set forth in claim 2, further comprising:
    means for drawing the master tape out of the first means outlet.

11. The tape transporting device as set forth in claim 2, further comprising:
    another rotatable means, outside the first means, for applying resistance to the movement of the tape.

12. The tape transporting device as set forth in claim 11, wherein the another rotatable means comprises:
    a main roller having an outer circumferential surface, the main roller for connection to a brake mechanism, and
    a pair of mobile rollers.

* * * * *